United States Patent
Luo et al.

(10) Patent No.: US 12,397,652 B2
(45) Date of Patent: Aug. 26, 2025

(54) SYSTEM FOR MUTUAL INDUCTANCE CANCELLATION FOR X-TYPE MULTILEVEL CONVERTERS

(71) Applicant: GM GLOBAL TECHNOLOGY OPERATIONS LLC, Detroit, MI (US)

(72) Inventors: Yilun Luo, Ann Arbor, MI (US); Junghoon Kim, Springboro, OH (US); Khorshed Mohammed Alam, Canton, MI (US); Chandra S. Namuduri, Troy, MI (US); Rashmi Prasad, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 18/501,296

(22) Filed: Nov. 3, 2023

(65) Prior Publication Data

US 2025/0145009 A1      May 8, 2025

(51) Int. Cl.
*H02P 25/22* (2006.01)
*B60L 15/00* (2006.01)
(Continued)

(52) U.S. Cl.
CPC ......... *B60L 15/007* (2013.01); *H02M 1/0054* (2021.05); *H02M 1/008* (2021.05);
(Continued)

(58) Field of Classification Search
None
See application file for complete search history.

(56) References Cited

U.S. PATENT DOCUMENTS

| 12,172,548 B2 | 12/2024 | Ling et al. |
| 2006/0152085 A1 | 7/2006 | Flett et al. |

(Continued)

FOREIGN PATENT DOCUMENTS

| DE | 19724356 C1 | 5/1998 |
| DE | 102021114080 A1 | 5/2022 |
| DE | 102021203869 A1 | 10/2022 |

OTHER PUBLICATIONS

Neutral-Point-Less (NPL) Multilevel Inverter Topology With Single DC-Link Capacitor: H-Type Inverter; Mikayla Benson, Xiaofang Dong, Musab Guven, and Kangbeen Lee; Conference Paper, Jun. 2022; DOI: 10.1109/ITEC53557.2022.9813762; Department of Electrical and Computer Engineering; East Lansing, Michigan, 7 pages.

(Continued)

*Primary Examiner* — Rexford N Barnie
*Assistant Examiner* — Esayas G Yeshaw
(74) *Attorney, Agent, or Firm* — Quinn IP Law

(57) ABSTRACT

A multi-phase power inverter for an electric propulsion system includes a plurality of X-type multilevel power converters arranged between a high-voltage direct current (DC) power supply and an electric machine. Each of the plurality of X-type multilevel power converters is a solid-state integrated circuit (IC) that includes a positive DC power bus, a negative DC power bus, a neutral bus, and a plurality of semiconductor switches disposed in a stacked arrangement. The plurality of semiconductor switches is interconnected via the positive DC power bus, the negative DC power bus, and the neutral bus.

20 Claims, 5 Drawing Sheets

(51) Int. Cl.
  *H02M 1/00* (2006.01)
  *H02M 7/487* (2007.01)
  *H02M 7/49* (2007.01)
(52) U.S. Cl.
  CPC ............ *H02M 7/487* (2013.01); *H02M 7/49* (2013.01); *B60L 2210/46* (2013.01)

(56) References Cited

U.S. PATENT DOCUMENTS

| | | | |
|---|---|---|---|
| 2006/0274561 | A1 | 12/2006 | Ahmed et al. |
| 2016/0043659 | A1* | 2/2016 | Xu ................... H02M 1/088 363/131 |
| 2016/0141962 | A1* | 5/2016 | Outram ............ H02M 3/33507 363/21.01 |
| 2017/0353137 | A1* | 12/2017 | Pan ........................ H02P 5/00 |
| 2018/0097452 | A1 | 4/2018 | Chapman et al. |
| 2018/0248493 | A1* | 8/2018 | Mihalache ............ H02M 7/483 |
| 2018/0288907 | A1 | 10/2018 | Richards et al. |
| 2019/0061537 | A1 | 2/2019 | Ge et al. |
| 2019/0348924 | A1* | 11/2019 | Kumar ................... H02H 1/043 |
| 2020/0053900 | A1 | 2/2020 | Feurtado et al. |
| 2021/0234475 | A1 | 7/2021 | Banerjee et al. |
| 2021/0297009 | A1 | 9/2021 | Liu et al. |
| 2022/0304185 | A1* | 9/2022 | Nishimachi ......... H02M 7/5387 |
| 2023/0238895 | A1* | 7/2023 | Moon ................... H02M 7/487 363/40 |

OTHER PUBLICATIONS

Comprehensive Electromagnetic Interference Analysis of Neutral-Point-Less (NPL) Multilevel Inverter With Active Common-Mode Voltage Cancellation; Kangbeen Lee, Mikayla Benson, Mostafa Fereydoonian, and Xiaofeng Dong; Conference Paper, Mar. 2023; DOI: 10.1109/APEC43580.2023.10131636.

* cited by examiner

SYSTEM FOR MUTUAL INDUCTANCE CANCELLATION FOR X-TYPE MULTILEVEL CONVERTERS

INTRODUCTION

The concepts described herein relate generally to vehicles employing electrified powertrain or propulsion systems, which are composed with direct current (DC) power supplies providing alternating current (AC) electric power to multi-phase power inverters to control operation of one or multiple electric machines.

High-voltage and high-power multilevel inverters (MLIs) have gained attention as the transportation electrification trend is rapidly expanding towards high-capacity mass transit systems such as electric aircraft, trains, and ships. MLIs such as neutral point clamped (NPC) and T-type inverters provide high-voltage and high-power operation capabilities but include stacked DC-link capacitors with a neutral point connection for zero voltage vector. This neutral point connection to the stacked DC-link capacitor may generate a neutral current oscillating at three times the fundamental frequency, which may cause capacitor voltage imbalance and overvoltage stress on capacitors and switching devices.

A multi-phase inverter circuit may generate an inherent power loop in which high current flows from a DC-link capacitor to a high-side of the multilevel power inverter, then to a low-side of the multilevel power inverter and back. The power loop may generate a magnetic field, which forms parasitic inductance.

As multi-phase power inverters operate at higher switching frequencies, even small levels of parasitic inductance may lead to issues, for example, but not limited to, ringing and/or electromagnetic interference (EMI).

The current flow path determines the size of the power loop, which determines the size of the magnetic field generated, and hence the size of the parasitic inductance. The current flow path is defined by the topology of the circuit, and therefore the topology of the circuit may affect the size of the parasitic inductance.

SUMMARY

In view of the above discussion, it is useful to develop a system and method of mutual inductance cancellation for a multi-phase power inverter including a plurality of X-type multilevel power converters having a topology that reduces parasitic inductance within the multi-phase power inverter and/or within each X-type multilevel power converter.

The concepts disclosed herein relate to a system for a multi-phase power inverter including a plurality of X-type multilevel power converters that achieve mutual inductance cancellation. Such as system may be used in vehicles having an electrified propulsion system, for example, but not limited to, a motor vehicle having an electrified powertrain or propulsion system, e.g., an electric vehicle (EV) or plug-in hybrid vehicle (PHEV), or another mobile platform, which may be powered by an electric propulsion system, to reduce parasitic inductance within the multi-phase power inverter.

Each multi-phase power inverter may include a plurality of X-type multilevel power converters arranged between a high-voltage direct current (DC) power supply and an electric machine. The number of X-type multilevel power converters required is application specific.

Each X-type multilevel power converter may be configured as a solid-state integrated circuit (IC) that includes a plurality of circuit components, for example, but not limited to semiconductor switches and busbars, which are connected to form a network of interconnections through which current may flow. The form of this network of interconnected circuitry is called a circuit topology.

The concepts described herein provide a multi-phase power inverter that is advantageously arranged to minimize stray inductance and loop inductance employing magnetic field cancellation. This includes using cancelling fields by arranging positive, neutral and negative buses and a plurality of X-type multilevel power converters arranged in solid-state integrated circuits having stacked or tiered elements. The arrangement of the X-type multilevel power converters with stacked or tiered elements enables either single-sided or double-sided cooling to reduce thermal impedance. This configuration may serve to reduce stray inductance, thus leading to lower switching loss, less ringing, less electromagnetic interference (EMI), and lower device thermal stress.

An aspect of the disclosure may include a multi-phase power inverter for an electric drivetrain, wherein the multi-phase power inverter transforms high-voltage DC electric power to multi-phase alternating current (AC) power that is transferred to the electric drivetrain. The multi-phase power inverter includes a plurality of X-type multilevel power converters that are arranged between a high-voltage DC power supply and an electric machine. Each of the plurality of X-type multilevel power converters is a solid-state IC including: a positive DC power bus; a negative DC power bus; a first neutral bus; a second neutral bus; a first AC bus; a second AC bus; a plurality of semiconductor switches including a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch; a first power diode, and a second power diode; a first heat sink adjoined to the positive DC power bus of the solid-state IC via a first direct bonded copper (DBC) substrate; and a second heat sink adjoined to the negative DC power bus of the solid-state IC via a second DBC substrate.

The first semiconductor switch, the second semiconductor switch, the third semiconductor switch, and the fourth semiconductor switch are connected in series between the positive DC power bus and the negative DC power bus. The fifth semiconductor switch, the sixth semiconductor switch, the seventh semiconductor switch, and the eighth semiconductor switch are connected in series between the positive DC power bus and the negative DC power bus. The first semiconductor switch is connected to the second semiconductor switch at a first node, the second semiconductor switch is connected to the third semiconductor switch at a second node, third semiconductor switch is connected to the fourth semiconductor switch at a third node, the fifth semiconductor switch is connected to the sixth semiconductor switch at a fourth node, the sixth semiconductor switch is connected to the seventh semiconductor switch at a fifth node, and the seventh semiconductor switch is connected to the eighth semiconductor switch at a sixth node. The first power diode is connected between the third node and the fourth node, and the second power diode is connected between the first node and the sixth node. The second node is connected to the first AC bus, and the fifth node is connected to the second AC bus.

Another aspect of the disclosure may include the plurality of semiconductor switches, the positive DC power bus, the negative DC power bus, the first AC bus, the second AC bus, the first power diode, and the second power diode being arranged into a plurality of tiers including: a first tier composed of the first semiconductor switch arranged coplanar with the second semiconductor switch that is arranged coplanar with the third semiconductor switch that is arranged coplanar with the fourth semiconductor switch; a second tier composed of the first power diode, the second power diode, the positive DC power bus that is arranged coplanar with the first AC bus, and the negative DC power bus that is arranged coplanar with the negative AC bus; and a third tier composed of the second semiconductor switch arranged coplanar with the third semiconductor switch that is arranged coplanar with the sixth semiconductor switch that is arranged coplanar with the seventh semiconductor switch; wherein the first tier is arranged parallel to the second tier that is arranged parallel to the third tier.

Another aspect of the disclosure may include the first AC bus being arranged parallel to the second AC bus.

Another aspect of the disclosure may include the positive DC power bus being arranged parallel to the negative DC power bus.

Another aspect of the disclosure may include the positive DC power bus and the negative DC power bus being arranged at a first end of the X-type multilevel power converter, and the first AC bus and the second AC bus being arranged at a second end of the X-type multilevel power converter.

Another aspect of the disclosure may include the first semiconductor switch, the second semiconductor switch, the third semiconductor switch, and the fourth semiconductor switch being adjoined to a first side of the first DBC substrate, and the first heat sink is adjoined to a second side of the first DBC substrate; and the fifth semiconductor switch, the sixth semiconductor switch, the seventh semiconductor switch, and the eighth semiconductor switch being adjoined to a first side of the second DBC substrate, and the second heat sink is adjoined to a second side of the second DBC substrate.

Another aspect of the disclosure may include the plurality of semiconductor switches, the positive DC power bus, the negative DC power bus, the first AC bus, the second AC bus, the first power diode, and the second power diode being arranged into a plurality of tiers including: a first tier composed of the first semiconductor switch arranged coplanar with the second semiconductor switch that is arranged coplanar with the third semiconductor switch that is arranged coplanar with the fourth semiconductor switch, the positive DC power bus, and the first AC bus; a second tier composed of the first power diode and the second power diode; and a third tier composed of the second semiconductor switch arranged coplanar with the third semiconductor switch that is arranged coplanar with the sixth semiconductor switch that is arranged coplanar with the seventh semiconductor switch, the negative DC power bus, and the second AC bus; wherein the first tier is arranged parallel to the second tier that is arranged parallel to the third tier.

Another aspect of the disclosure may include the first AC bus being arranged parallel to the second AC bus.

Another aspect of the disclosure may include the positive DC power bus being arranged parallel to the negative DC power bus.

Another aspect of the disclosure may include the first semiconductor switch, the second semiconductor switch, the third semiconductor switch, and the fourth semiconductor switch being adjoined to a first side of the first DBC substrate, and the first heat sink being adjoined to a second side of the first DBC substrate; and the fifth semiconductor switch, the sixth semiconductor switch, the seventh semiconductor switch, and the eighth semiconductor switch being adjoined to a first side of the second DBC substrate, and the second heat sink being adjoined to a second side of the second DBC substrate.

Another aspect of the disclosure may include an X-type multilevel power converter for a multi-phase electric power inverter, the X-type multilevel power converter being a solid-state integrated circuit (IC) including: a positive DC power bus; a negative DC power bus; a first neutral bus; a second neutral bus; a first AC bus; a second AC bus; a plurality of semiconductor switches including a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch; a first power diode, and a second power diode; a first heat sink adjoined to the positive DC power bus of the solid-state IC via a first direct bonded copper (DBC) substrate; and a second heat sink adjoined to the negative DC power bus of the solid-state IC via a second DBC substrate.

The first semiconductor switch, the second semiconductor switch, the third semiconductor switch, and the fourth semiconductor switch are connected in series between the positive DC power bus and the negative DC power bus. The fifth semiconductor switch, the sixth semiconductor switch, the seventh semiconductor switch, and the eighth semiconductor switch are connected in series between the positive DC power bus and the negative DC power bus. The first semiconductor switch is connected to the second semiconductor switch at a first node, the second semiconductor switch is connected to the third semiconductor switch at a second node, third semiconductor switch is connected to the fourth semiconductor switch at a third node, the fifth semiconductor switch is connected to the sixth semiconductor switch at a fourth node, the sixth semiconductor switch is connected to the seventh semiconductor switch at a fifth node, and the seventh semiconductor switch is connected to the eighth semiconductor switch at a sixth node. The first power diode is connected between the third node and the fourth node, and the second power diode is connected between the first node and the sixth node. The second node is connected to the first AC bus, and the fifth node is connected to the second AC bus.

Another aspect of the disclosure may include an electrified vehicle having an electric propulsion system that includes an electric motor configured to provide power to the electric propulsion system and a multi-phase inverter including a plurality of X-type multilevel power converters arranged between a high-voltage DC power supply and an electric machine, wherein each of the plurality of X-type multilevel power converters is a solid-state IC.

Another aspect of the disclosure may include a method of inductance cancellation in a multi-phase power inverter, including: arranging a plurality of semiconductor switches in an X-type multilevel stack; assembling the plurality of semiconductor switches, arranged into the X-type multilevel stack, into a solid-state integrated circuit (IC) having: a positive DC power bus; a negative DC power bus; and a neutral bus; and interconnecting the plurality of semiconductor switches via the positive DC power bus, the negative DC power bus, and the neutral bus.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

Figure 1:
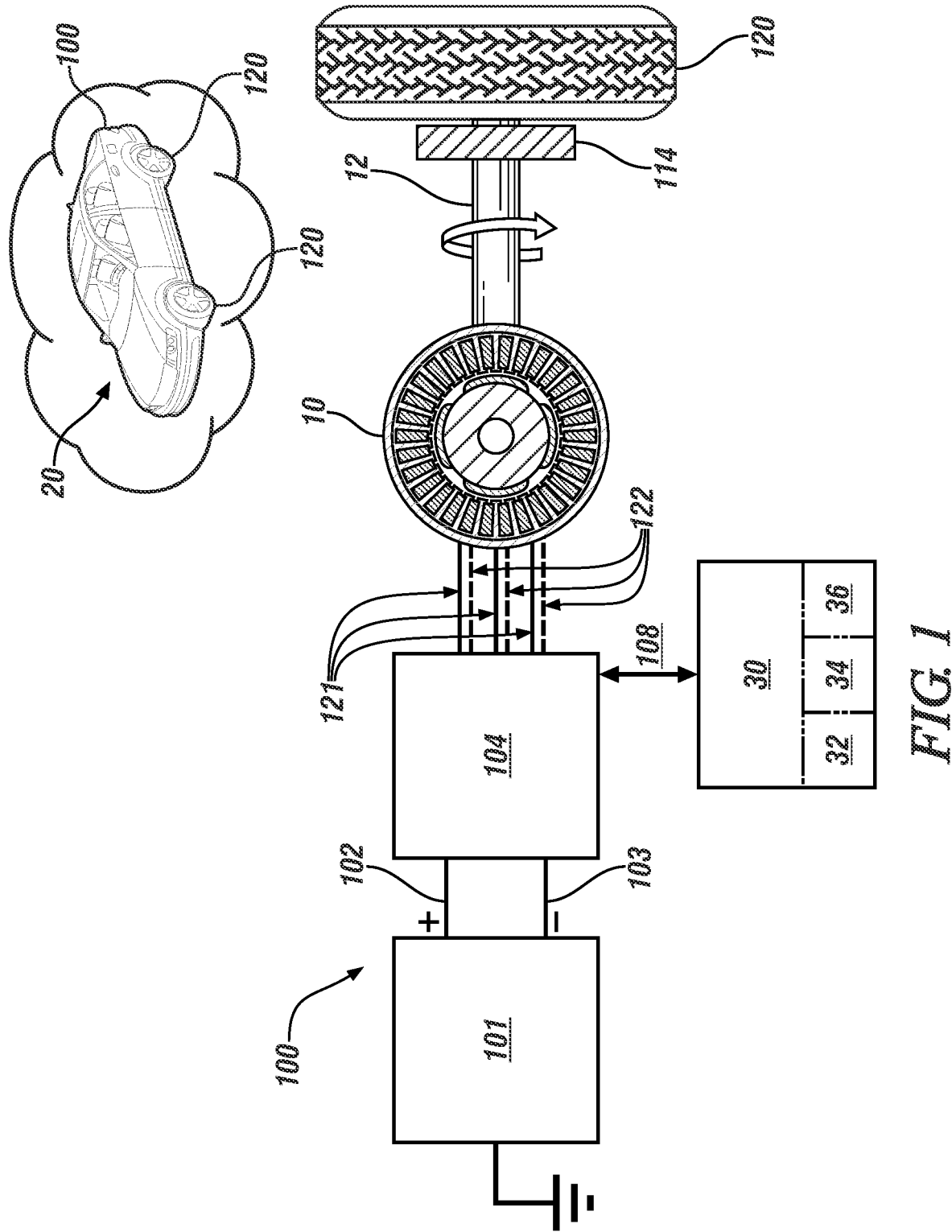
FIG. 1 schematically illustrates an electric drivetrain system including a multi-phase power inverter that is arranged between a high-voltage direct current (DC) power supply and an electric machine, in accordance with the disclosure.

The appended drawings are not necessarily to scale and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The components of each aspect of the disclosure, as described and illustrated herein, may be arranged and designed in a variety of different configurations. Thus, the following detailed description is not intended to limit the scope of the disclosure, as claimed, but is merely representative of possible aspect of the disclosure thereof. In addition, while numerous specific details are set forth in the following description in order to provide a thorough understanding of each aspect of the disclosure disclosed herein, some aspects of the disclosure may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The present disclosure is susceptible to embodiment in many different forms. Representative examples of the disclosure are shown in the drawings and described herein in detail as non-limiting examples of the disclosed principles. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as "vertical", "horizontal", "left", "right", "upper", "lower", "top", "bottom" and similar expressions are non-limiting terms that merely describe the various elements as illustrated in the Figures and are not intended to limit the scope of the disclosure.

As used herein, the term "electric machine" refers to an electric motor/generator device including a rotor and a stator that is capable of converting electric power to mechanical power and/or converting mechanical power to electric power by electromagnetic effort.

Figure 2:
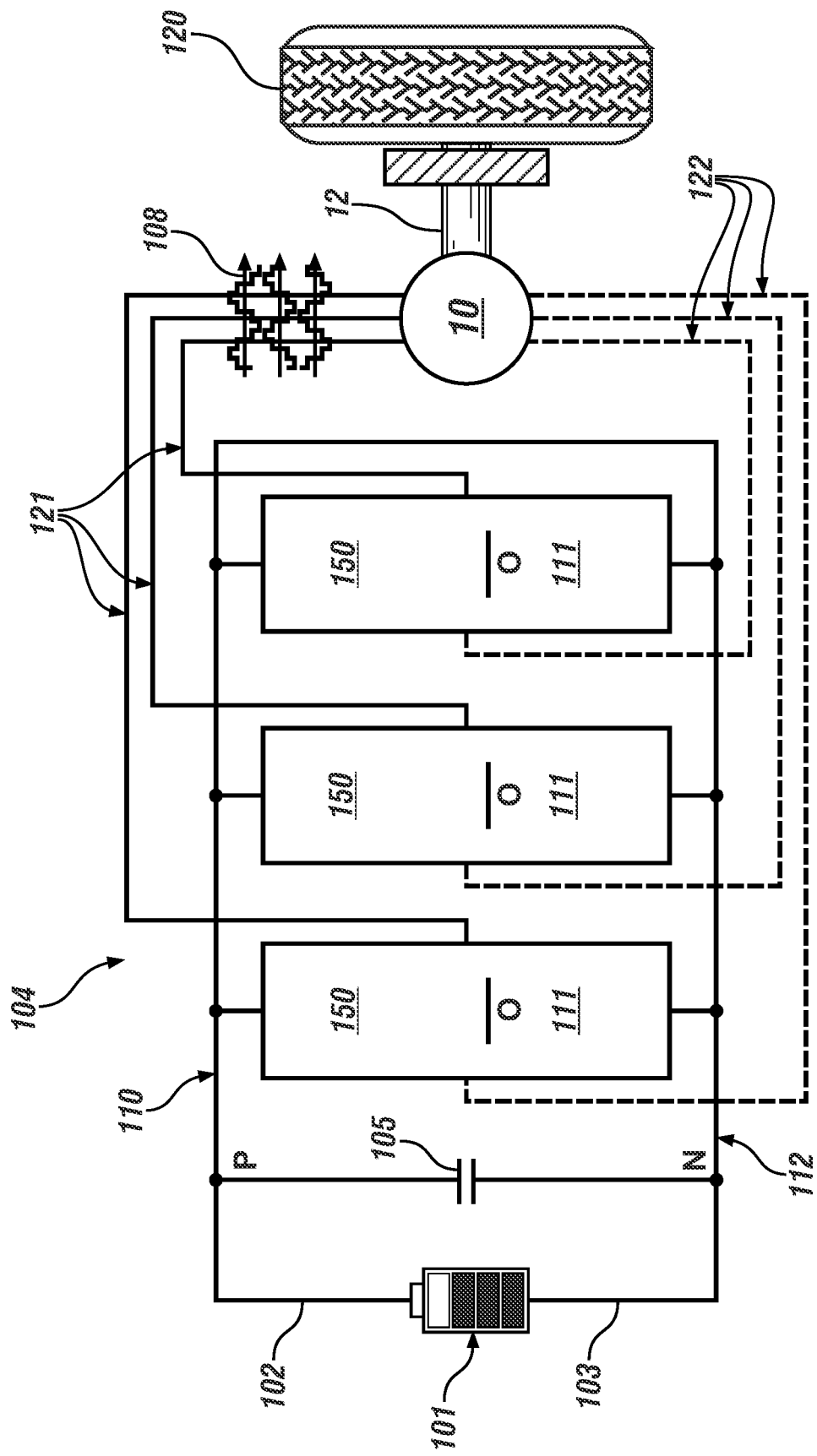
FIG. 2 schematically illustrates an electric drivetrain system including a multi-phase power inverter includes a plurality of X-type multilevel power converters that are arranged between a high-voltage DC power supply and an electric machine, in accordance with the disclosure.

Referring to the drawings, wherein like reference numbers refer to the same or like components in the several Figures, FIGS. 1 and 2 schematically illustrate an electric drivetrain 100 that is composed of a direct current (DC) power source 101, a multi-phase power inverter 104, a multi-phase rotary electric motor, generator, or motor-generator (electric machine) 10, and a torque actuator 120, the operations of which are monitored and controlled by a controller 30. In one aspect of the disclosure, the electric drivetrain 100 is arranged to generate and transfer torque to the torque actuator 120 in the form of one or multiple drive wheels to effect work. Controller 30 executes control routines to control and manage operation of the multi-phase power inverter 104. In one aspect of the disclosure, the electric drivetrain 100 is disposed on an electrified vehicle, schematically illustrated at 20, and capable of generating tractive torque for vehicle propulsion. When disposed on the electrified vehicle 20, the electrified vehicle 20 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric drivetrain 100 may be an element of a stationary system.

The controller 30 may be embodied as one or more digital computing devices, and may include one or more processors 34 and memory 32. A control routine 36 may be stored as an executable instruction set in the memory 32 and executed by one of the processors 34 of the controller 30. The controller 30 is in communication with the multi-phase power inverter 104 to control operation thereof in response to execution of the control routine 36 to operate the electric machine 10. The multi-phase power inverter 104 exchanges or transfers electric power to the electric machine 10 via a plurality of first AC buses 121 and second AC buses 122.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital inverters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

The electric machine 10 includes a cylindrically-shaped rotor assembly arranged on a rotor shaft and disposed within an annularly-shaped stator, wherein the rotor assembly is coaxial with a rotor opening that is formed in the stator. Other elements of the electric machine 10, e.g., end caps, shaft bearings, electrical connections, etc., are included but not shown. Electrical windings of the stator are arranged with a quantity of electrical phases and a quantity of electrical turns per phase. Depending on the specific arrangement, the quantity of electrical phases may be between 3 and 6, and the quantity of layers of conductors may be between 4 and 12.

The multi-phase power inverter 104 includes a plurality of semiconductor switches (illustrated with reference to FIG. 3, et seq.) that are arranged and controllable to transform direct current (DC) electric power to alternating current (AC) electric power, and transform AC electric power to DC electric power, employing a pulse-width modulation signal 108 or another control technique. The multi-phase power inverter 104 is arranged and is controllable to transform DC electric power originating from the high-voltage DC power source 101 to AC electric power to actuate the electric machine 10 via electromagnetic effort. The electric machine 10 is controllable to rotate and generate mechanical torque that is transferred via a rotatable member 12 and a geartrain 114 to the torque actuator 120 when operating in a torque generating mode. The electric machine 10 is controllable to generate AC electric power from mechanical torque originating at the torque actuator 120 via electromagnetic effort, which is transformed by the multi-phase power inverter 104 to DC electric power for storage in the high-voltage DC power source 101 when operating in an electric power generating mode. The torque actuator 120 includes, in one aspect of the disclosure, a vehicle wheel that transfers torque to a ground surface to effect forward motion as part of a traction propulsion system. The high-voltage DC power source 101 may be in the form of a rechargeable electrochemical battery device, a fuel cell, an ultracapacitor, and/or another electrical energy storage/generation technology.

The high-voltage DC power source 101 may be a rechargeable electrochemical battery device, a fuel cell, an ultracapacitor, and/or another electrical energy storage/generation technology. The high-voltage DC power source 101 connects to the multi-phase power inverter 104 via a high-voltage DC bus having a positive link 102 and a negative link 103, and the multi-phase power inverter 104 connects to the electric machine 10 via a plurality of first AC buses 121 and second AC buses 122 to transfer the pulse-width modulation signal 108.

As illustrated with reference to FIG. 2, the multi-phase power inverter 104 of the electric drivetrain 100 is composed with a plurality of X-type multilevel power converters 150 that are arranged between the high-voltage DC power source 101 and the electric machine 10, with a DC-link capacitor 105 between the high-voltage DC power source 101 and the multi-phase power inverter 104 of the electric drivetrain 100, and with respective first AC buses 121 and second AC buses 122. As illustrated, and in one non-limiting aspect of the disclosure, the multi-phase power inverter 104 of the electric drivetrain 100 is composed with a quantity of three of the X-type multilevel power converters 150.

Figure 3:
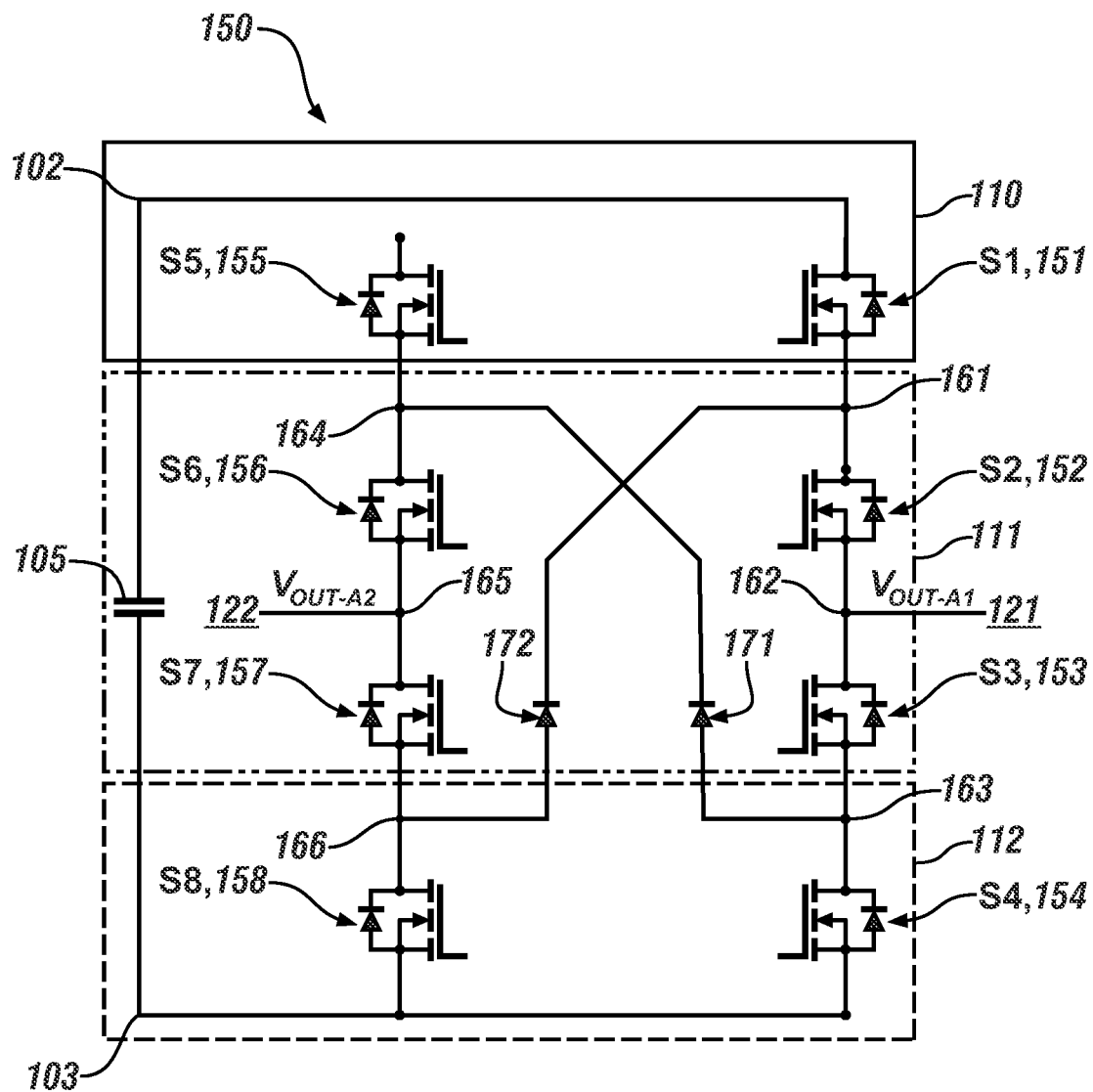
FIG. 3 schematically illustrates an electrical circuit diagram of an X-type multilevel power converter, in accordance with one aspect of the disclosure.

FIG. 3 schematically illustrates one of the X-type multilevel power converters 150, which is arranged as a solid-state integrated circuit (IC) having a plurality of semiconductor switches that are disposed in a stacked or tiered arrangement. The plurality of semiconductor switches includes, in one aspect of the disclosure and as shown, a first semiconductor switch S1 151, a second semiconductor switch S2 152, a third semiconductor switch S3 153, a fourth semiconductor switch S4 154, a fifth semiconductor switch S5 155, a sixth semiconductor switch S6 156, a seventh semiconductor switch S7 157, and an eighth semiconductor switch S8 158. In one aspect of the disclosure, at least a portion of the semiconductor switches are field-effect transistors (FETs). In one aspect of the disclosure, the FETs are gallium nitride (GaN) transistors. In one aspect of the disclosure, at least a portion of the semiconductor switches are insulated-gate bipolar transistors (IGBTs).

Other constituent elements of the X-type multilevel power converter 150 includes the positive DC power bus 110, neutral bus 111, and the negative DC power bus 112. The positive DC power bus 110 is connected to the positive link 102 of the high-voltage DC bus, and the negative DC power bus 112 is connected to the negative link 103 of the high-voltage DC bus.

The first semiconductor switch S1 151, the second semiconductor switch S2 152, third semiconductor switch S3 153, and the fourth semiconductor switch S4 154 are arranged in series between the positive DC power bus 110 and the negative DC power bus 112. This includes: the first semiconductor switch S1 151 being connected to the second semiconductor switch S2 152 at first node 161; the second semiconductor switch S2 152 being connected to the third semiconductor switch S3 153 at second node 162; the third semiconductor switch S3 153 being connected to the fourth semiconductor switch S4 154 at third node 163.

The fifth semiconductor switch S5 155, sixth semiconductor switch S6 156, seventh semiconductor switch S7 157, and eighth semiconductor switch S8 158 are arranged in series between the positive DC power bus 110 and the negative DC power bus 112. This includes: the fifth semiconductor switch S5 155 being connected to the sixth semiconductor switch S6 156 at fourth node 164; the sixth semiconductor switch S6 156 being connected to the seventh semiconductor switch S7 157 at fifth node 165; and the seventh semiconductor switch S7 being connected to the eighth semiconductor switch S8 158 at sixth node 166.

A first power diode 171 is arranged between the fourth node 164 and the third node 163, with the anode of the first power diode 171 being connected to the fourth node 164 and the cathode of the first power diode 171 being connected to the third node 163.

A second power diode 172 is arranged between the first node 161 and the sixth node 166, with the anode of the second power diode 172 being connected to the sixth node 166 and the cathode of the second power diode 172 being connected to the first node 161.

The first node 161 connects to the first AC bus 121 to transfer power to the electric machine 10 (shown with reference to FIG. 2).

The second node 162 connects to the second AC bus 122 to transfer power to the electric machine 10 (shown with reference to FIG. 2).

A positive DC power bus 110, a neutral power bus 111, and a negative DC power bus 112, are schematically illustrated.

By configuring the topology within each of the X-type multilevel converters 150 such that both the positive DC power bus 110 and the negative DC power bus 112 are parallel with the neutral bus 111, mutual inductance cancellation minimizes parasitic inductance by coupling positive mutual inductance and negative mutual inductance for commutation loop currents within each of the X-type multilevel converters 150.

According to one aspect of the disclosure, illustrated at (I), the buses are configured, from top 33 to bottom 34, such that the positive DC power bus 110 is parallel to the neutral bus 111, which is then parallel to the negative DC power bus 112.

According to another aspect of the disclosure, as illustrated at (II), the buses are configured, from top 33 to bottom 34, such that the positive DC power bus 110 is parallel to the negative DC power bus 112, which is then parallel to the neutral bus 111.

According to another aspect of the disclosure, as illustrated at (III), the buses are configured, from top 33 to bottom 34, such that the neutral bus 111, is parallel with the positive DC power bus 110, which is then parallel to the negative DC power bus 112.

According to another aspect of the disclosure, as illustrated at (IV), the positive DC power bus 110 is coplanar with the negative DC power bus 112, while both the positive DC power bus 110 and the negative DC power bus 112 are parallel with the neutral bus 111.

While several topologies are discussed above, they are merely exemplary and non-limiting aspects of the disclosure. Accordingly, it should be appreciated that, within each of the X-type multilevel converters 150, mutual inductance cancellation minimizes parasitic inductance by coupling positive mutual inductance and negative mutual inductance for commutation loop currents within each of the X-type multilevel converters 150, i.e., by configuring the topology of the X-type multilevel inverter 150 such that both the positive DC power bus 110 and the negative DC power bus 112 are parallel with the neutral bus 111.

Figure 4A:
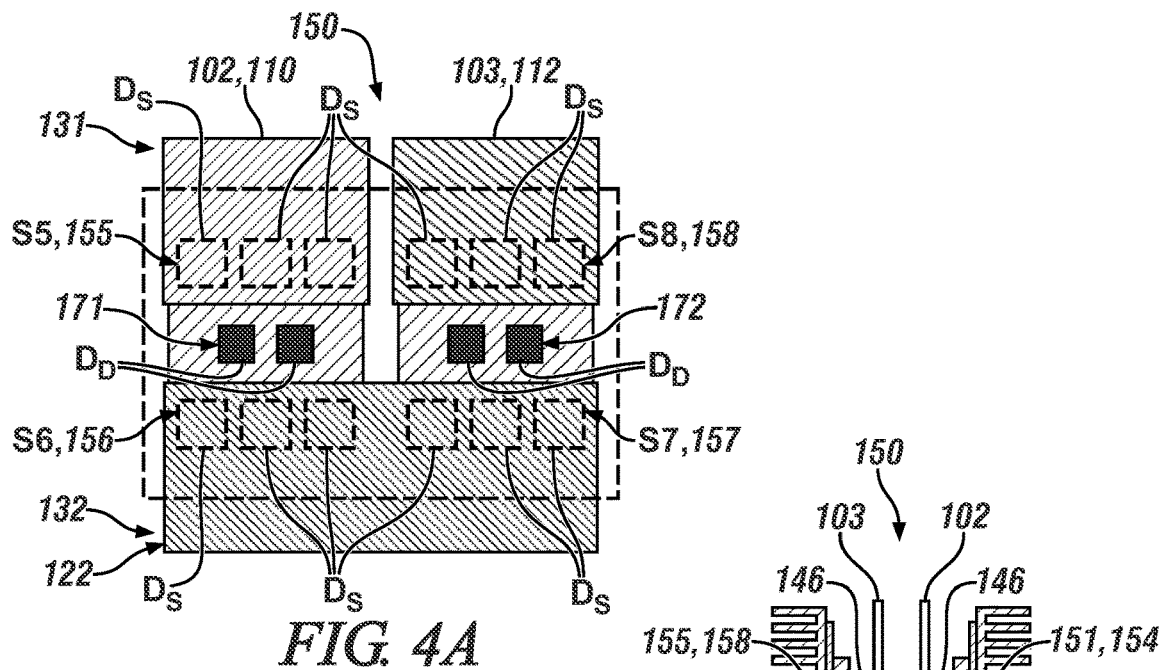
FIG. 4A schematically illustrates a cutaway front view of an X-type multilevel power converter, in accordance with one aspect the disclosure.
Figure 4B:
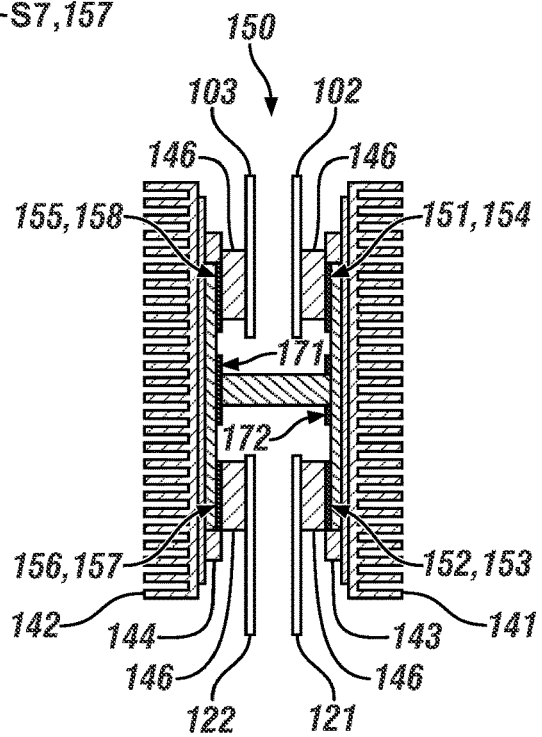
FIG. 4B schematically illustrates a cutaway end view of an X-type multilevel power converter, in accordance with one aspect the disclosure.
Figure 4C:
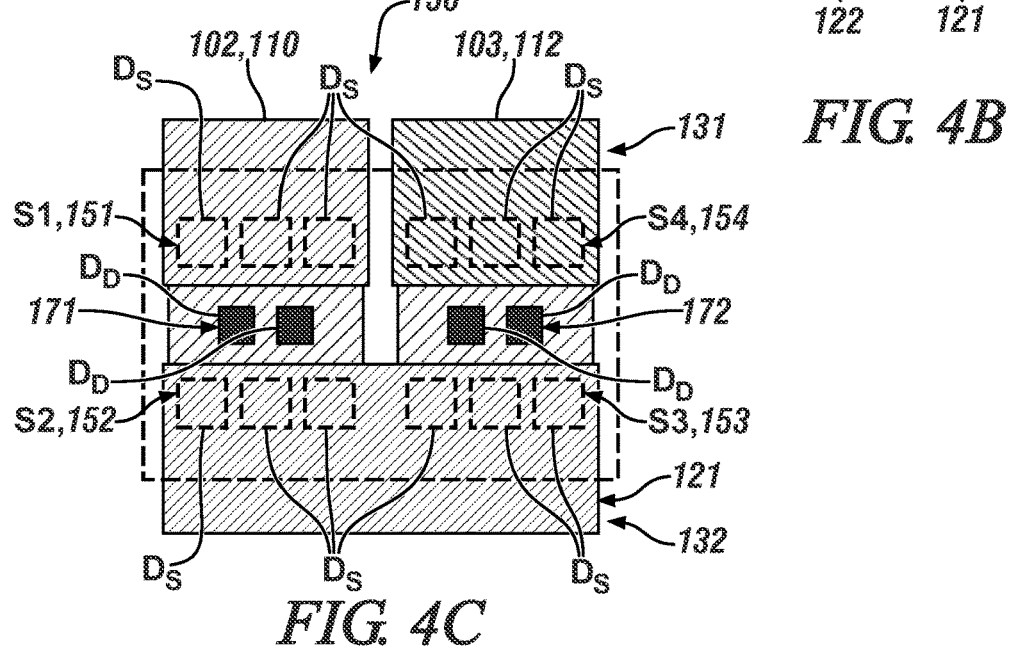
FIG. 4C schematically illustrates a cutaway rear view of an X-type multilevel power converter, in accordance with one aspect of the disclosure.

Referring now to FIGS. 4A, 4B, and 4C, a topology of one of the X-type multilevel power converters 150 according to one aspect of the disclosure is shown, and arranged as a multilevel inverter (MLI). In one aspect of the disclosure, and as described herein, each of the X-type multilevel power converters 150 employs a neutral-point-less (NPL) MLI topology. Topology refers to the physical arrangement of the constituent elements, including network busbar interconnects, dielectrics, semiconductor switches, and other elements.

The X-type multilevel power converter 150 is arranged as a solid-state integrated circuit (IC) having a plurality of semiconductor switches that are disposed in a stacked or tiered arrangement. According to one aspect of the disclosure, the plurality of semiconductor switches includes, a first semiconductor switch S1 151, a second semiconductor switch S2 152, a third semiconductor switch S3 153, a fourth semiconductor switch S4 154, a fifth semiconductor switch S5 155, a sixth semiconductor switch S6 156, a seventh semiconductor switch S7 157, an eighth semiconductor switch S8 158, a first power diode 171, and a second power diode 172.

According to one aspect of the present disclosure, each semiconductor switch S1-S8 151-158 includes three dies $D_S$ arranged parallel to one another. It should be appreciated, however, that each semiconductor switch S1-S8 151-158 may include a number of dies arranged parallel to one another that is different than the three dies illustrated, as determined by each application.

According to one aspect of the disclosure, at least a portion of the semiconductor switches are field-effect transistors (FETs). According to another aspect of the disclosure, the FETs are gallium nitride (GaN) transistors. According to another aspect of the disclosure, at least a portion of the semiconductor switches are insulated-gate bipolar transistors (IGBTs).

According to one aspect of the present disclosure, each power diode 171, 172 includes two dies $D_D$ arranged parallel to one another. It should be appreciated, however, that each power diode 171, 172 may include a number of dies arranged parallel to one another that is different than the two dies illustrated, as determined by each application.

Other elements of the X-type multilevel power converter 150 includes the positive DC power bus 110, neutral bus 111, the negative DC power bus 112, the first AC bus 121, and the second AC bus 122. The positive DC power bus 110 and the negative DC power bus 112 are arranged at a first end 131 of the X-type multilevel power converter 150. The first AC bus 121 and the second AC bus 122 are arranged at a second end 132 of the X-type multilevel power converter 150, which is opposite to the first end 131.

The first semiconductor switch S1 151, the second semiconductor switch S2 152, the third semiconductor switch S3 153, the fourth semiconductor switch S4 154, fifth semiconductor switch S5 155, the sixth semiconductor switch S6 156, the seventh semiconductor switch S7 157, the eighth semiconductor switch S8 158, the first power diode 171, and the second power diode 172 are arranged in a stacked or multi-tiered configuration, including a first tier 135, a second tier 136, and a third tier 137.

The first tier 135 includes the first semiconductor switch S1 151, the second semiconductor switch S2 152, the third semiconductor switch S3 153, the fourth semiconductor switch S4 154, the first heat sink 141, and the first DBC plate 143.

The second tier 136 includes the first power diode 171 and the second power diode 172, conductive spacers 146, the positive DC power bus 110, the neutral bus 111, the negative DC power bus, the first AC bus 121, and the second AC bus 122.

The third tier 137 includes the fifth semiconductor switch S5 155, the sixth semiconductor switch S6 156, the seventh semiconductor switch S7 157, the eighth semiconductor switch S8 158, the second DBC plate 144, and the second heat sink 142.

Other elements of the X-type multilevel power converter 150 includes the positive DC power bus 110, the neutral bus 111, the negative DC power bus, the first AC bus 121, and the second AC bus 122. The positive DC power bus 110 and the negative DC power bus 112 are arranged at a first end 131 of the X-type multilevel power converter 150. The first AC bus 121 and the second AC bus 122 are arranged at a second end 132 of the X-type multilevel power converter 150, which is opposite to the first end 131.

Figure 5A:
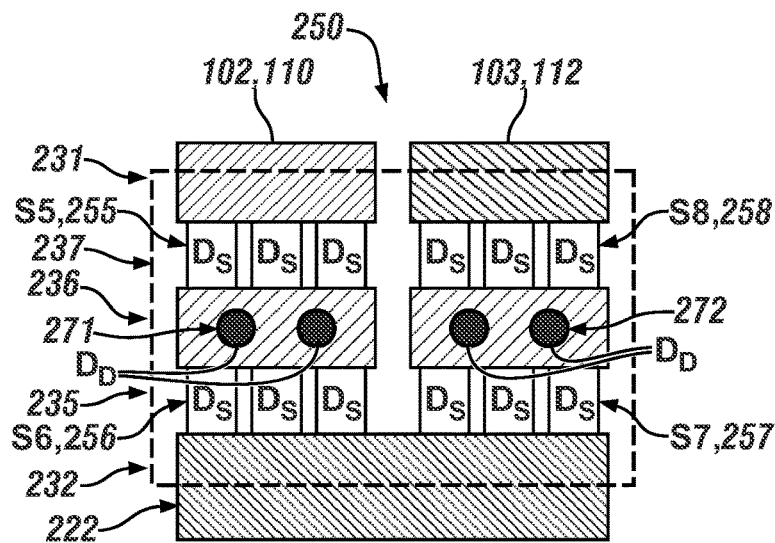
FIG. 5A schematically illustrates a cutaway front view of an X-type multilevel power converter, in accordance with another aspect of the disclosure.
Figure 5B:
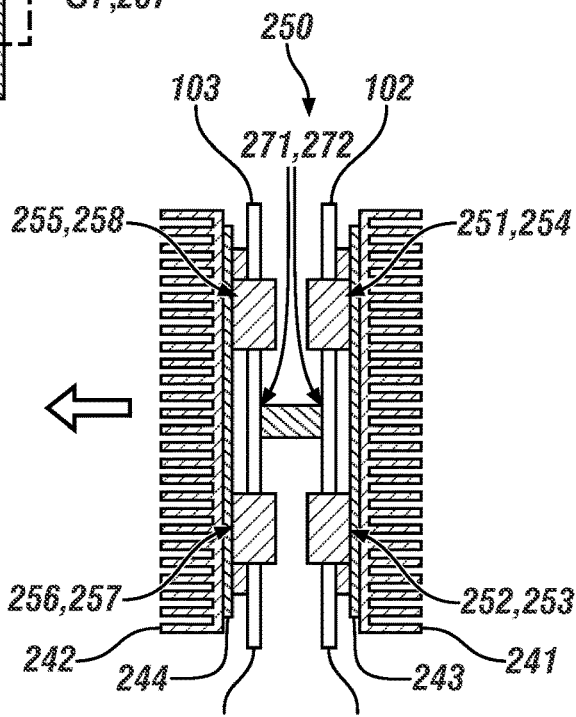
FIG. 5B schematically illustrates a cutaway end view of an X-type multilevel power converter, in accordance with another aspect of the disclosure.
Figure 5C:
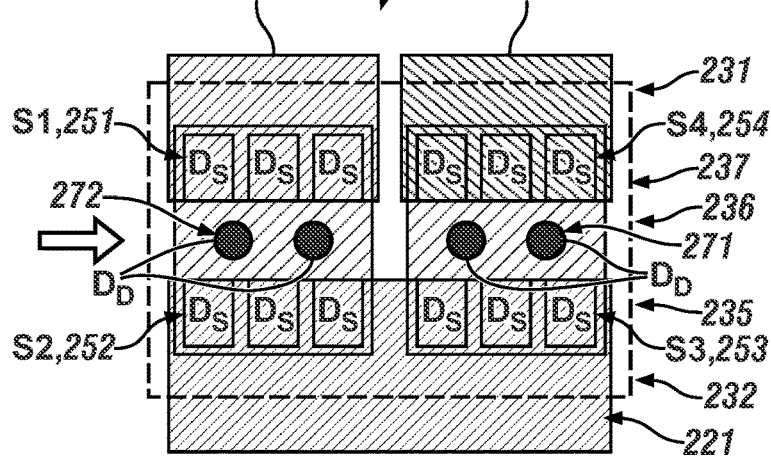
FIG. 5C schematically illustrates a cutaway rear view of an X-type multilevel power converter, in accordance with another aspect of the disclosure.

Referring now to FIGS. 5A, 5B, and 5C, a topology of one of the X-type multilevel power converters 250 according to another aspect of the disclosure is shown, and arranged as a multilevel inverter (MLI). In another aspect of the disclosure, and as described herein, each of the X-type multilevel power converters 250 employs a neutral-point-less (NPL) MLI topology.

The X-type multilevel power converter 250 is arranged as a solid-state integrated circuit (IC) having a plurality of semiconductor switches that are disposed in a stacked or tiered arrangement. According to one aspect of the disclosure, the plurality of semiconductor switches includes, a first semiconductor switch S1 251, a second semiconductor switch S2 252, a third semiconductor switch S3 253, a fourth semiconductor switch S4 254, a fifth semiconductor switch S5 255, a sixth semiconductor switch S6 256, a seventh semiconductor switch S7 257, an eighth semiconductor switch S8 258, a first power diode 271, and a second power diode 272. According to one aspect of the disclosure, at least a portion of the semiconductor switches are field-effect transistors (FETs). According to another aspect of the disclosure, the FETs are gallium nitride (GaN) transistors. According to another one aspect of the disclosure, at least a portion of the semiconductor switches are insulated-gate bipolar transistors (IGBTs).

Other elements of the X-type multilevel power converter 250 includes the positive DC power bus 110, the neutral bus 111, the negative DC power bus, the first AC bus 121, and the second AC bus 122. The positive DC power bus 110 and the negative DC power bus 112 are arranged at a first end 231 of the X-type multilevel power converter 250. The first AC bus 121 and the second AC bus 122 are arranged at a second end 232 of the X-type multilevel power converter 250, which is opposite to the first end 231.

The first semiconductor switch S1 251, the second semiconductor switch S2 252, the third semiconductor switch S3 253, the fourth semiconductor switch S4 254, the fifth semiconductor switch S5 255, the sixth semiconductor switch S6 256, the seventh semiconductor switch S7 257, the eighth semiconductor switch S8 258, the first power diode 271, and the second power diode 272 are arranged in a stacked or multi-tiered configuration, including a first tier 235, a second tier 236, and a third tier 237.

The first tier 235 includes the first semiconductor switch S1 251, the second semiconductor switch S2 252, the third semiconductor switch S3 253, the fourth semiconductor switch S4 254, the first heat sink 241, and the first DBC plate 243.

The second tier 236 includes the first power diode 271 and the second power diode 272, the positive DC power bus 110, the neutral bus 111, the negative DC power bus 112, the first AC bus 121, and the second AC bus 122.

The third tier 237 includes the fifth semiconductor switch S5 255, the sixth semiconductor switch S6 256, the seventh semiconductor switch S7 257, the eighth semiconductor switch S8 258, the second DBC plate 244, and the second heat sink 242.

The illustrated aspects of the disclosure of the X-type multilevel power converter provide for overlapping of the positive DC power bus 110, the neutral bus 111, and the negative DC power bus 112 to reduce mutual inductance. This arrangement includes overlaying the first AC bus 121 on the second AC bus 122 to cancel dV/dt and reduce or eliminate electromagnetic interference and achieve field cancellation via the P, 0, and N currents to minimize parasitic loop and stray inductances.

The concepts and aspects of the disclosure described herein facilitate optimal design of the positive DC power bus 110, the negative DC power bus 112, the neutral bus 111, and the DC-link capacitor 105 to achieve mutual inductance cancellation.

The concepts and aspects of the disclosure described herein facilitate various heat transfer and cooling systems, including direct cooling, indirect cooling, immersive cooling, single-sided or double-sided cooling.

The concepts and aspects of the disclosure described herein facilitate a reduction in voltage/current overshoot for device stress, including die/power module, the bus bars, and the DC-link capacitor.

The concepts and aspects of the disclosure described herein facilitate size reduction and increased power density compared to current systems.

The concepts and aspects of the disclosure described herein facilitate use of lower voltage rating semiconductor switch dies for lower conduction loss and increased EV range compared to current systems.

The concepts and aspects of the disclosure described herein facilitate reduced ringing and radiative/conductive electromagnetic interference to other sub-systems.

The concepts and aspects of the disclosure described herein facilitate higher switching speed which may reduce loss and hence increase vehicle range and current capability.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other examples for carrying out the present teachings have been described in detail, various alternative designs and aspects of the disclosure exist for practicing the present teachings defined in the appended claims.

The invention claimed is:

1. A multi-phase power inverter for an electric propulsion system, the multi-phase power inverter comprising:
   a plurality of X-type multilevel power converters arranged to transfer electric power between a high-voltage direct current (DC) power supply and an electric machine, wherein each of the plurality of X-type multilevel power converters is arranged as a solid-state integrated circuit (IC) including:
   a positive DC power bus;
   a negative DC power bus;
   a first neutral bus;
   a second neutral bus;
   a first alternating current (AC) bus;
   a second AC bus;
   a plurality of semiconductor switches disposed in a tiered arrangement, the plurality of semiconductor switches including a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch;

a first power diode, and a second power diode;

a first heat sink adjoined to the positive DC power bus of each of the X-type multilevel power converters via a first direct bonded copper (DBC) substrate; and a second heat sink adjoined to the negative DC power bus of each of the X-type multilevel power converters via a second DBC substrate; and wherein the first semiconductor switch, the second semiconductor switch, the third semiconductor switch, and the fourth semiconductor switch are connected in series between the positive DC power bus and the negative DC power bus;

wherein the fifth semiconductor switch, the sixth semiconductor switch, the seventh semiconductor switch, and the eighth semiconductor switch are connected in series between the positive DC power bus and the negative DC power bus;

wherein the first semiconductor switch is connected to the second semiconductor switch at a first node, wherein the second semiconductor switch is connected to the third semiconductor switch at a second node, and wherein third semiconductor switch is connected to the fourth semiconductor switch at a third node;

wherein the fifth semiconductor switch is connected to the sixth semiconductor switch at a fourth node, wherein the sixth semiconductor switch is connected to the seventh semiconductor switch at a fifth node, and wherein the seventh semiconductor switch is connected to the eighth semiconductor switch at a sixth node;

wherein the first power diode is connected between the third node and the fourth node;

wherein the second power diode is connected between the first node and the sixth node;

wherein the second node is connected to the first AC bus; and wherein the fifth node is connected to the second AC bus.

2. The multi-phase power inverter as recited in claim 1, wherein the plurality of semiconductor switches, the positive DC power bus, the negative DC power bus, the first AC bus, the second AC bus, the first power diode, and the second power diode are arranged into a plurality of tiers including:

a first tier composed of the first semiconductor switch arranged coplanar with the second semiconductor switch that is arranged coplanar with the third semiconductor switch that is arranged coplanar with the fourth semiconductor switch;

a second tier composed of the first power diode, the second power diode, the positive DC power bus that is arranged coplanar with the first AC bus, and the negative DC power bus that is arranged coplanar with the negative AC bus; and a third tier composed of the second semiconductor switch arranged coplanar with the third semiconductor switch that is arranged coplanar with the sixth semiconductor switch that is arranged coplanar with the seventh semiconductor switch, wherein the first tier is arranged parallel to the second tier that is arranged parallel to the third tier.

3. The multi-phase power inverter as recited in claim 2, wherein the first AC bus is arranged parallel to the second AC bus.

4. The multi-phase power inverter as recited in claim 3, wherein the positive DC power bus is arranged parallel to the negative DC power bus.

5. The multi-phase power inverter as recited in claim 4, wherein the positive DC power bus and the negative DC power bus are arranged at a first end of the X-type multilevel power converter, and wherein the first AC bus and the second AC bus are arranged at a second end of the X-type multilevel power converter.

6. The multi-phase power inverter as recited in claim 2, wherein the first semiconductor switch, the second semiconductor switch, the third semiconductor switch, and the fourth semiconductor switch are adjoined to a first side of the first DBC substrate, and the first heat sink is adjoined to a second side of the first DBC substrate; and wherein the fifth semiconductor switch, the sixth semiconductor switch, the seventh semiconductor switch, and the eighth semiconductor switch are adjoined to a first side of the second DBC substrate, and the second heat sink is adjoined to a second side of the second DBC substrate.

7. The multi-phase power inverter as recited in claim 1, wherein the plurality of semiconductor switches, the positive DC power bus, the negative DC power bus, the first AC bus, the second AC bus, the first power diode, and the second power diode are arranged into a plurality of tiers including:

a first tier composed of the first semiconductor switch arranged coplanar with the second semiconductor switch that is arranged coplanar with the third semiconductor switch that is arranged coplanar with the fourth semiconductor switch, the positive DC power bus, and the first AC bus;

a second tier composed of the first power diode and the second power diode; and a third tier composed of the second semiconductor switch arranged coplanar with the third semiconductor switch that is arranged coplanar with the sixth semiconductor switch that is arranged coplanar with the seventh semiconductor switch, the negative DC power bus, and the second AC bus; and wherein the first tier is arranged parallel to the second tier that is arranged parallel to the third tier.

8. The multi-phase power inverter as recited in claim 7, wherein the first AC bus is arranged parallel to the second AC bus.

9. The multi-phase power inverter as recited in claim 7, wherein the positive DC power bus is arranged parallel to the negative DC power bus.

10. The multi-phase power inverter as recited in claim 1, wherein the first semiconductor switch, the second semiconductor switch, the third semiconductor switch, and the fourth semiconductor switch are adjoined to a first side of the first DBC substrate, and the first heat sink is adjoined to a second side of the first DBC substrate; and wherein the fifth semiconductor switch, the sixth semiconductor switch, the seventh semiconductor switch, and the eighth semiconductor switch are adjoined to a first side of the second DBC substrate, and the second heat sink is adjoined to a second side of the second DBC substrate.

11. An X-type multilevel power converter for a multiphase electric power inverter, the X-type multilevel power converter comprising:
- a positive direct current (DC) power bus;
- a negative DC power bus;
- a first neutral bus;
- a second neutral bus;
- a first alternating current (AC) bus;
- a second AC bus; and
- a plurality of semiconductor switches arranged as a solid-state integrated circuit (IC), the plurality of semiconductor switches disposed in a tiered arrangement, and interconnected via the positive DC power bus, the negative DC power bus, the first neutral bus, and the second neutral bus, the plurality of semiconductor switches including:
  - a first semiconductor switch connected at a first node;
  - a second semiconductor switch connected to the first semiconductor switch at the first node, the first semiconductor switch arranged in series with the second semiconductor switch between the first AC bus and the positive DC power bus, wherein the first AC bus is connected at a second node;
  - a third semiconductor switch connected at a third node, wherein the second semiconductor switch is connected to the third semiconductor switch at the second node, the second semiconductor switch arranged in series with the third semiconductor switch between the positive DC power bus and the negative DC power bus;
  - a fourth semiconductor switch connected to the third semiconductor switch at the third node, wherein the third semiconductor switch is arranged in series with the fourth semiconductor switch between the first AC bus and the negative DC power bus;
  - a fifth semiconductor switch connected at a fourth node;
  - a sixth semiconductor switch connected to the fifth semiconductor switch at the fourth node, wherein the fifth semiconductor switch is arranged in series with the sixth semiconductor switch between the second AC bus and the positive DC power bus, wherein the second AC bus is connected to a fifth node;
  - a seventh semiconductor switch connected to a sixth node, wherein the sixth semiconductor switch is connected to the seventh semiconductor switch at the fifth node, the sixth semiconductor switch arranged in series with the seventh semiconductor switch between the positive DC bus and the negative DC power bus;
  - an eighth semiconductor switch connected to the seventh semiconductor switch at the sixth node, wherein the seventh semiconductor switch is arranged in series with the eighth semiconductor switch between the second AC bus and the negative DC power bus; and
- a first power diode having a first end connected at the first node and the first power diode having a second end connected at the sixth node via the first neutral bus;
- a second power diode having a first end connected at the third node and the second power diode having a second end connected at the fourth node via the second neutral bus;
- a first heat sink adjoined to the positive DC power bus of the X-type multilevel power converter via a first direct bonded copper (DBC) substrate; and
- a second heat sink adjoined to the negative DC power bus of the X-type multilevel power converter via a second DBC substrate.

12. The X-type multilevel power converter as recited in claim 11, wherein the plurality of semiconductor switches, the positive DC power bus, the negative DC power bus, the first AC bus, the second AC bus, the first power diode, and the second power diode are arranged into a plurality of tiers including:
- a first tier composed of the first semiconductor switch arranged coplanar with the second semiconductor switch that is arranged coplanar with the third semiconductor switch that is arranged coplanar with the fourth semiconductor switch;
- a second tier composed of the first power diode, the second power diode, the positive DC power bus that is arranged coplanar with the first AC bus, and the negative DC power bus that is arranged coplanar with the negative AC bus; and
- a third tier composed of the second semiconductor switch arranged coplanar with the third semiconductor switch that is arranged coplanar with the sixth semiconductor switch that is arranged coplanar with the seventh semiconductor switch, wherein the first tier is arranged parallel to the second tier that is arranged parallel to the third tier.

13. The X-type multilevel power converter as recited in claim 12, wherein the first AC bus is arranged parallel to the second AC bus.

14. The X-type multilevel power converter as recited in claim 13, wherein the positive DC power bus is arranged parallel to the negative DC power bus.

15. The X-type multilevel power converter as recited in claim 14, wherein the positive DC power bus and the negative DC power bus are arranged at a first end of the X-type multilevel power converter, and wherein the first AC bus and the second AC bus are arranged at a second end of the X-type multilevel power converter.

16. The X-type multilevel power converter as recited in claim 12, wherein the first semiconductor switch, the second semiconductor switch, the third semiconductor switch, and the fourth semiconductor switch are adjoined to a first side of the first DBC substrate, and the first heat sink is adjoined to a second side of the first DBC substrate; and
- wherein the fifth semiconductor switch, the sixth semiconductor switch, the seventh semiconductor switch, and the eighth semiconductor switch are adjoined to a first side of the second DBC substrate, and the second heat sink is adjoined to a second side of the second DBC substrate.

17. The X-type multilevel power converter as recited in claim 11, wherein the plurality of semiconductor switches, the positive DC power bus, the negative DC power bus, the first AC bus, the second AC bus, the first power diode, and the second power diode are arranged into a plurality of tiers including:
- a first tier composed of the first semiconductor switch arranged coplanar with the second semiconductor switch that is arranged coplanar with the third semiconductor switch that is arranged coplanar with the fourth semiconductor switch, the positive DC power bus, and the first AC bus;
- a second tier composed of the first power diode and the second power diode; and
- a third tier composed of the second semiconductor switch arranged coplanar with the third semiconductor switch that is arranged coplanar with the sixth semiconductor switch that is arranged coplanar with the seventh semiconductor switch, the negative DC power bus, and the second AC bus, wherein the first tier is arranged parallel to the second tier that is arranged parallel to the third tier.

18. The X-type multilevel power converter as recited in claim 17, wherein the first AC bus is arranged parallel to the second AC bus.

19. The X-type multilevel power converter as recited in claim 17, wherein the positive DC power bus is arranged parallel to the negative DC power bus.

20. An electrified vehicle, comprising:
an electric propulsion system including:
an electric motor configured to provide power to the electric propulsion system;
a multi-phase inverter including a plurality of X-type multilevel power converters arranged between a high-voltage direct current (DC) power supply and an electric machine, wherein each of the plurality of X-type multilevel power converters is arranged as a solid-state integrated circuit (IC) including:
a positive DC power bus;
a negative DC power bus;
a first neutral bus;
a second neutral bus;
a first alternating (AC) bus;
a second AC bus;
a plurality of semiconductor switches disposed in a tiered arrangement, the plurality of semiconductor switches interconnected via the positive DC power bus, the negative DC power bus, the first neutral bus, and the second neutral bus, the plurality of semiconductor switches including:
a first semiconductor switch connected at a first node;
a second semiconductor switch connected to the first semiconductor switch at the first node, the first semiconductor switch arranged in series with the second semiconductor switch between the first AC bus and the positive DC power bus, wherein the first AC bus is connected at a second node;
a third semiconductor switch connected at a third node, wherein the second semiconductor switch is connected to the third semiconductor switch at the second node, the second semiconductor switch arranged in series with the third semiconductor switch between the positive DC power bus and the negative DC power bus;
a fourth semiconductor switch connected to the third semiconductor switch at the third node, wherein the third semiconductor switch is arranged in series with the fourth semiconductor switch between the first AC bus and the negative DC power bus;
a fifth semiconductor switch connected at a fourth node;
a sixth semiconductor switch connected to the fifth semiconductor switch at the fourth node, wherein the fifth semiconductor switch is arranged in series with the sixth semiconductor switch between the second AC bus and the positive DC power bus, wherein the second AC bus is connected to a fifth node;
a seventh semiconductor switch connected to a sixth node, wherein the sixth semiconductor switch is connected to the seventh semiconductor switch at the fifth node, the sixth semiconductor switch arranged in series with the seventh semiconductor switch between the positive DC bus and the negative DC power bus;
an eighth semiconductor switch connected to the seventh semiconductor switch at the sixth node, wherein the seventh semiconductor switch is arranged in series with the eighth semiconductor switch between the second AC bus and the negative DC power bus;
a first power diode having a first end connected at the first node and the first power diode having a second end connected at the sixth node via the first neutral bus;
a second power diode having a first end connected at the third node and the second power diode having a second end connected at the fourth node via the second neutral bus;
a first heat sink adjoined to the positive DC power bus of each of the X-type multilevel power converters via a first direct bonded copper (DBC) substrate; and
a second heat sink adjoined to the negative DC power bus of each of the X-type multilevel power converters via a second DBC substrate.

* * * * *